Feb. 14, 1928.

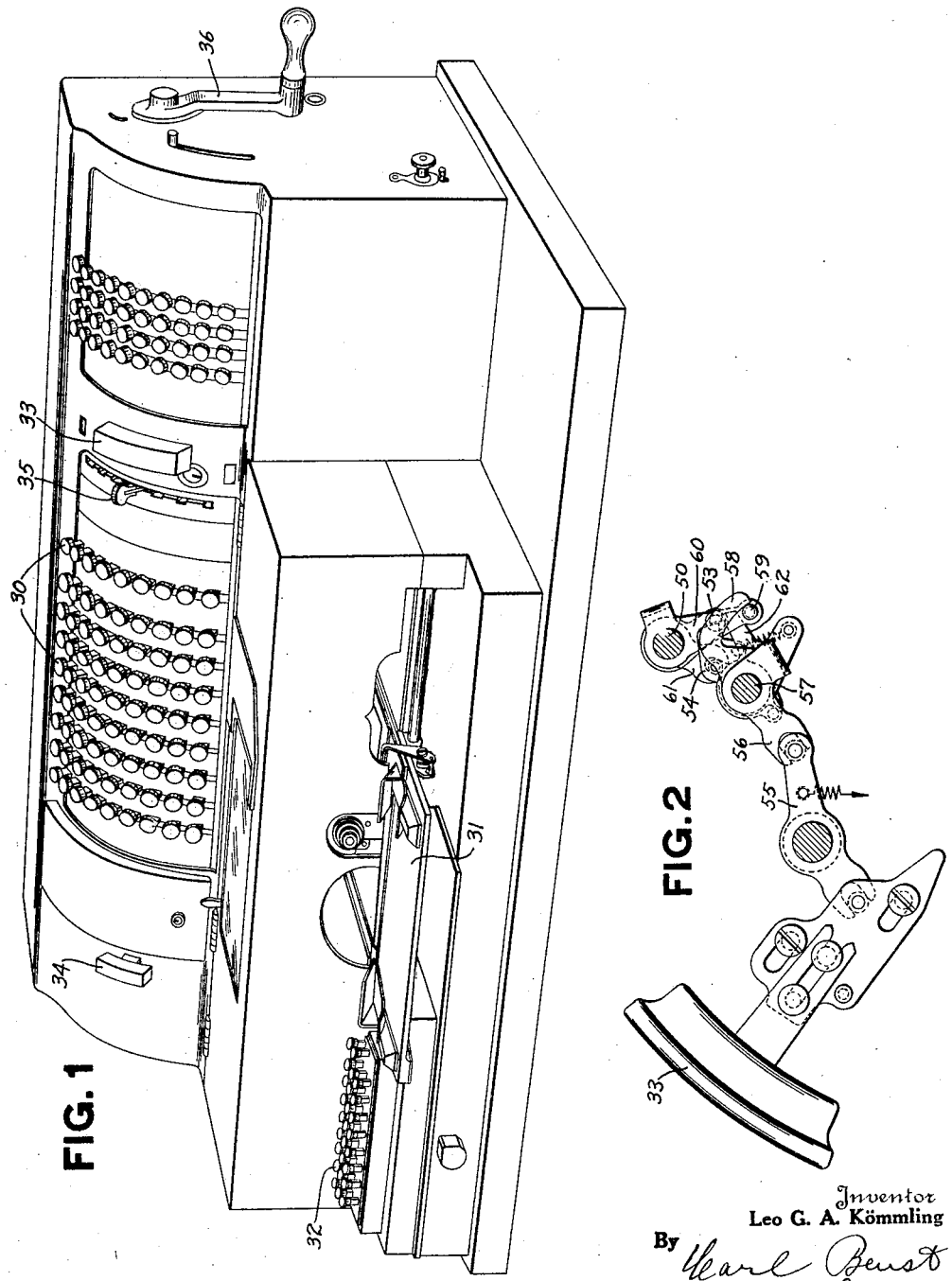

L. G. A. KÖMMLING 1,658,993

CASH REGISTER

Filed Dec. 11, 1926     5 Sheets-Sheet 2

Inventor
Leo G. A. Kömmling
By Carl Beust
Henry E. Stauffer
His Attorneys

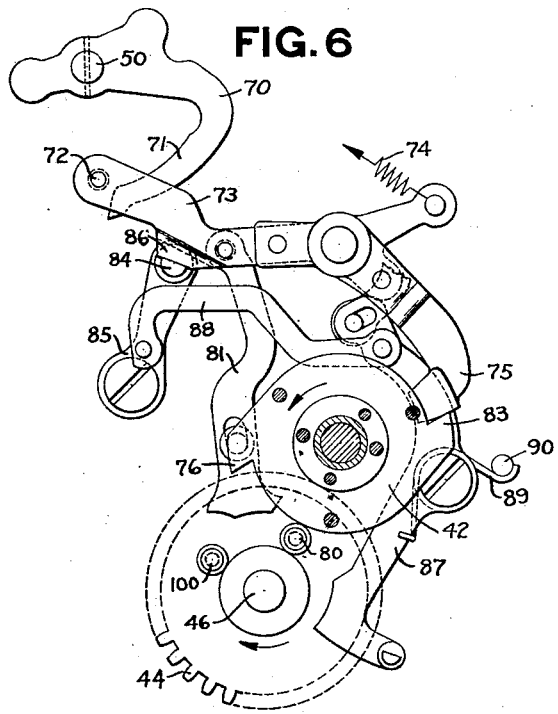
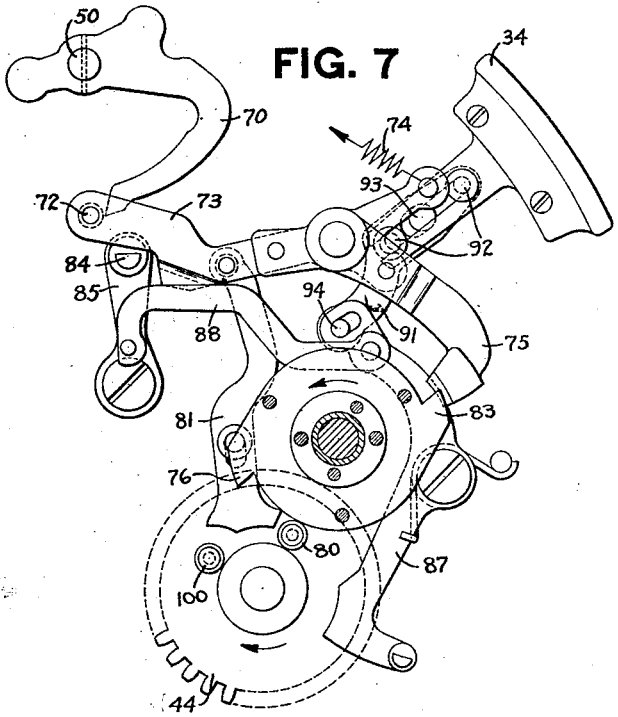

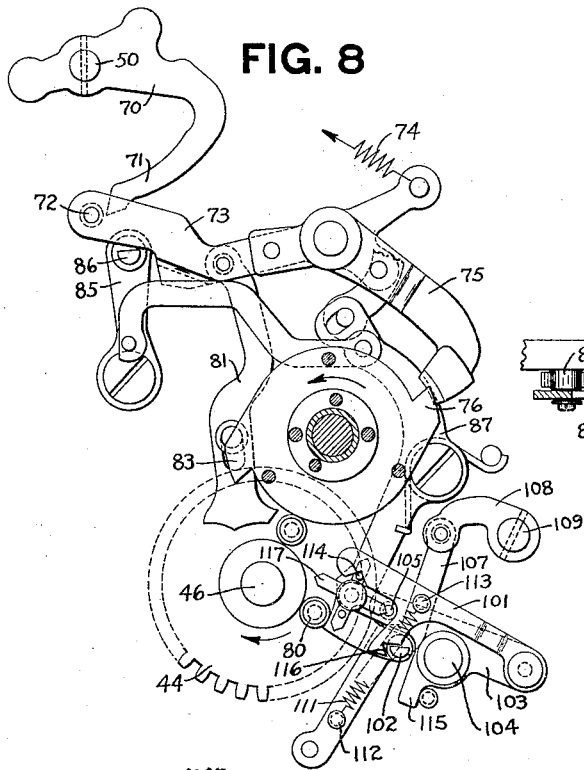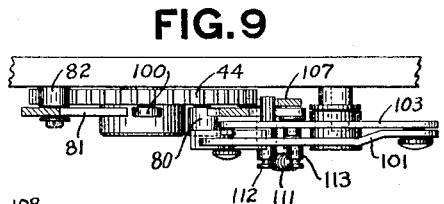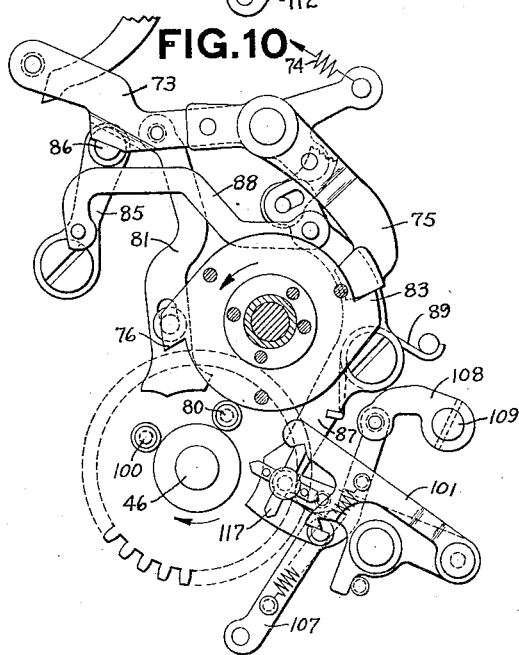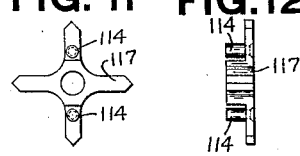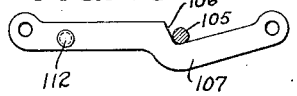

Feb. 14, 1928.

L. G. A. KÖMMLING 1,658,993

CASH REGISTER

Filed Dec. 11, 1926      5 Sheets-Sheet 5

FIG.14

| MEMO. | DATE | BALANCE | CREDIT | CHARGE | DEPARTMENT | ROOM |
|---|---|---|---|---|---|---|
| 1 | MAY 17-23 | ···15.50 | | ·····6.50 | Rooms ★ | A1456 |
| 2 | MAY 18-23 | | | ·····1.50 | Sundr's   ⊗ | A1456 |
| 3 | MAY 18-23 | | | ·····1.50 | Restrnt | A1456 |
| 4 | MAY 18-23 | ···24.50 | | ·····6.00 | Valet | A1456 |
| 5 | MAY 18-23 | | | ·····2.50 | Porter | A1456 |
| 6 | | | | | | |
| 7 | | | | | | |
| 8 | | | | | | |
| 9 | | | | | | |
| 10 | | | | | | |

FIG. 15

| MEMO. | DATE | BALANCE | CREDIT | CHARGE | DEPARTMENT | ROOM |
|---|---|---|---|---|---|---|
| 1 | MAY 17-23 | ····1.75 | | ·····1.75 | Restrnt | A1456 |
| 2 | MAY 17-23 | | | ·····3.50 | Laundry | A1456 |
| 3 | MAY 17-23 | | | ·····1.25 | L-Dist | A1456 |
| 4 | MAY 17-23 | ····8.50 | | ·····2.00 | Porter | A1456 |
| 5 | MAY 17-23 | | | ·····0.50 | L-Phon | A1456 |
| 6 | MAY 17-23 | ···15.50 | | ·····6.50 | Rooms ★ | A1456 |
| 7 | MAY 18-23 | | | ·····1.50 | Sundrs   ⊗ | A1456 |
| 8 | MAY 18-23 | | | ·····1.50 | Restrnt | A1456 |
| 9 | MAY 18-23 | ···24.50 | | ·····6.00 | Valet | A1456 |
| 10 | MAY 18-23 | | | ·····2.50 | Porter | A1456 |
| 11 | | | | | | |
| 12 | | | | | | |
| 13 | | | | | | |
| 14 | | | | | | |
| 15 | | | | | | |
| 16 | | | | | | |
| 17 | | | | | | |
| 18 | | | | | | |
| 19 | | | | | | |
| 20 | | | | | | |
| 21 | | | | | | |
| 22 | | | | | | |
| 23 | | | | | | |
| 24 | | | | | | |

Inventor
Leo G. A. Kömmling
By Carl Benst
Henry Stauffer
His Attorneys

Patented Feb. 14, 1928.

1,658,993

UNITED STATES PATENT OFFICE.

LEO G. A. KÖMMLING, OF BERLIN, GERMANY, ASSIGNOR TO THE NATIONAL CASH REGISTER COMPANY, OF DAYTON, OHIO, A CORPORATION OF MARYLAND.

CASH REGISTER.

Application filed December 11, 1926, Serial No. 154,208, and in Germany December 21, 1925.

This invention relates to improvements in cash registers, and more particularly to the stopping and releasing mechanism for machines of the type shown and described in Letters Patent of the United States No. 1,506,260, issued to B. M. Shipley on August 26, 1924.

The object of this invention is to provide a mechanism for automatically stopping the machine before it has completed its cycle of operation, so that the card carriage can be shifted before the second impression is taken, and to provide means for thereafter again releasing the machine.

With this and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said drawings:

Fig. 1 is a perspective view of the machine.

Fig. 2 is a detail view of the main motor bar releasing mechanism.

Fig. 6 is a detail view of the mechanism illustrated in Fig. 3, and shown in the position in which the machine is stopped before the cycle of operation has been completed.

Fig. 7 is a detail view of the mechanism shown in Fig. 3, and shows the position of the mechanism with the auxiliary release bar in its depressed position.

Fig. 8 is a detail view of the mechanism shown in Fig. 3, and shows the mechanism in its released position during total taking operations.

Fig. 9 is a plan view of a part of the mechanism shown in Fig. 8.

Fig. 10 is a detail view of the mechanism shown in Fig. 3, and shows the positions of the parts when the operation of the machine has been arrested before it has completed its second cycle of a total taking operation.

Fig. 11 is a detail view of the star wheel for controlling the special latch during total taking operations.

Fig. 12 is a detail end view of the star wheel shown in Fig. 11.

Fig. 13 is a detail view of the link which is operated by the totalizing lever during total taking operations.

Fig. 14 is a fragmentary portion of one of the ledger cards.

Fig. 15 is a detail view of a second ledger card and shows that the printing on this card is performed on different lines from that on the card shown in Fig. 14.

*General description.*

Figure 3:
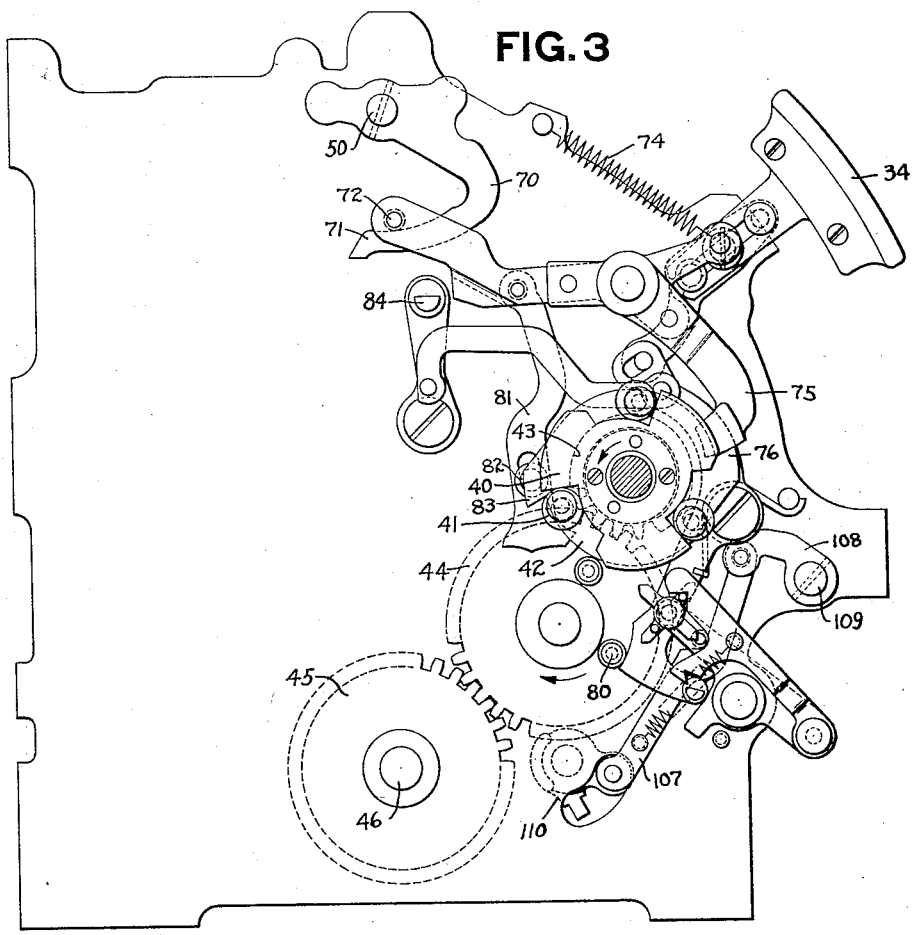
Fig. 3 is a left side view of the auxiliary releasing mechanism.

The machine to which the invention is shown attached is used for printing duplicate records on two cards during one cycle of operation of the machine. The cards are inserted in a movable carriage for selecting lines upon which the data are to be printed, but the positions of the corresponding items on the two cards may vary; for example, the item entered may be printed on line 1 on one card, and on line 6 on the second card because the sixth line is the first blank line on the second card. In machines of the type heretofore disclosed, the item entered in the machine is printed on the same line on both cards. In order to print on different lines on each card as provided herein, it is necessary to provide an automatic means for stopping the machine during the cycle of operation after the first impression has been made, so that the carriage can be shifted to cause an impression to be made on the desired line on the second card during the latter part of the same cycle of operation. To accomplish this, a means is provided for actuating the usual stopping device for stopping the machine, and an auxiliary motor bar is provided, near the left hand end of the machine, for releasing the machine after the carriage has been readjusted, so that the machine can complete its cycle of operation. During total taking operations, the machine makes two cycles of operation, but during the first cycle the printing mechanism is thrown off. For this reason a device has been provided herein for disabling the stopping device so that the machine will not be stopped until after the first impression has been made, which is during the second cycle of a total taking operation.

*Keyboard.*—The machine is provided with the usual amount and transaction keys 30 (Fig. 1), which are used for entering amounts into the totalizer and for setting up the various amounts and characters which are to be printed on the cards. The cards are inserted on a movable carriage 31 which is adjusted to select the particular line for printing by means of keys 32. This carriage is shown and described in a co-pending application of Bernis M. Shipley, Serial No. 610,273, filed January 2, 1923. The usual main motor bar 33 is provided for releasing the machine. The ensuing operation of the machine is interrupted subsequently to the first printing impression on the first card, to enable the operator to shift the carriage 31, after which the machine can be released by an auxiliary motor bar 34 which is located near the left hand end of the machine to permit the completion of the operation, during which another printing impression is made upon the second of the plurality of cards on the carriage 31. The usual totalizing lever 35 is provided for controlling the machine for adding and total taking operations. An operating handle 36 is provided by means of which the machine can be operated. However, if desired, the usual motor can be used for operating the machine.

*Driving mechanism.*—When the machine is operated by means of an electric motor, the usual well known clutch mechanism is provided, a part of which is shown in Fig. 3. For a detailed description of this clutch mechanism reference may be had to the above mentioned patent to Bernis M. Shipley. The clutch is provided with the usual disk 40 which is adapted to wedge rollers 41 carried by a disk 42 between the disk 40 and a clutch member not shown herein. The disk 40 is secured to a pinion 43 which meshes with a gear 44 which in turn meshes with a gear 45 secured to the main cam shaft 46. When the clutch is released for effective operation, the motor will turn the cam shaft 46 one complete rotation for item entering operations, and two complete rotations for total taking operations. When it is desired to operate the machine manually, the handle 36 (Fig. 1) is provided, which is connected by means of suitable gearing to the main cam shaft 46. This gearing is not shown herein, but it is well known in the art.

*Main motor bar.*—The machine is provided with the usual release shaft 50 (Fig. 5) which controls the releasing of the machine when the main motor bar 33 (Fig. 2) is depressed. A spring 51 normally tends to rock the release shaft clockwise by means of an arm 52 secured thereto. Also secured on the shaft 50 is an arm 53 (Fig. 2) having a flattened stud which normally engages a pawl 54 and prevents the shaft 50 from rotating. When the motor bar 33 is depressed, the pawl 54 is raised, thereby permitting the shaft 50 to rock under the tension of the spring 51. Depression of the motor bar 33 will rock an arm 55 which is connected to an arm 56 by means of a pin-and-slot connection. The arm 56 is loosely mounted on the shaft 57 and is yoked to another arm 58 which is adapted to engage a stud 59 carried by an arm 60, which is yoked to a bifurcated arm 61 connected to a stud in the before mentioned pawl 54. Thus, it is seen that when the motor bar 33 is depressed, the pawl 54 is raised, thereby permitting the spring 51 to rock the shaft 50 to release the machine.

The usual and well known non-repeat pawl 62 is provided which prevents a repeat operation of the machine, if the motor bar 33 is not permitted to be returned to its home position.

Figure 4:
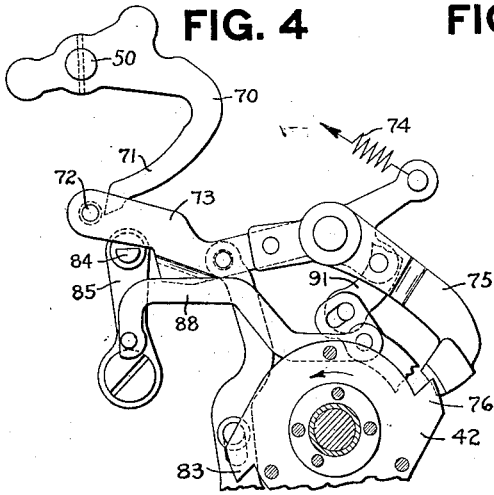
Fig. 4 is a detail view of a part of the mechanism illustrated in Fig. 3, shown in its released position.

When the release shaft 50 is released by depression of the motor bar, an arm 70 is permitted to rock in a counterclockwise direction (Fig. 3). The arm 70 is secured to the shaft 50 and is provided with a curved portion 71 with which a stud 72 on an arm 73 normally engages. A spring 74 tends to rock the arm 73 counter-clockwise, but is prevented from doing so by the curved portion 71. Secured to the arm 73 is a stop arm 75 which normally engages a shoulder 76 on the before mentioned disk 42. When the release shaft 50 is rotated, the arm 70 is rocked from engagement with the stud 72, thereby permitting the spring 74 to rock the stop arm 75 out of the path of the shoulder 76 (see Fig. 4) to permit rotation of the pinion 43 and thereby permit the machine to operate.

When the machine has been released as just described, it will be permitted to operate until after the first impression has been made on one of the cards. It should be remembered that two cards are inserted on the carriage at the same time, one on top of the other, and the impression hammer operates twice during each cycle of operation. After the first impression has been taken on the top card it is ejected from the machine. Let it be assumed that the first impression is to be made on the card shown in Fig. 14, and that this impression is to be made on the first line. When the card is inserted in the carriage, the carriage will be shifted to the appropriate position for printing on this line. After this impression has been taken, and the top card is ejected, the machine will be automatically stopped by the arm 75, thereby permitting the operator to shift the carriage for printing on the second card, as, for example, to the sixth line, as shown in Fig. 15, so that the second impression will be made on the sixth line of the second card. The mechanism for stopping the machine after the first impression takes place will now be described.

Secured to the before mentioned gear 44 (Fig. 3) is a roller 80 which is adapted to engage the lower end of a link 81, pivoted to the beforementioned arm 73, after the first impression takes place. The link 81 is guided by a stud 82 which projects through a slot in the link 81. When the stud 80 engages the lower end of the link 81, it will raise the arm 73, thereby causing the arm 75 which is secured thereto to be rocked into the path of a shoulder 83 (see Fig. 6), on the beforementioned disk 42, thus stopping the machine.

The arm 75 is held in position in the path of the shoulder 83 by means of a half-round stud 84 (Fig. 6) carried by an arm 85 which is adapted to be rocked beneath a surface of a shoulder 86 of the arm 73, when the arm 73 is raised as just described. The arm 85 is connected to a spring actuated lever 87 by means of a link 88. The lever 87 constantly tends to rotate in a clockwise direction due to a coil spring 89, one end of which bears against a stud 90 carried by the side frame of the machine, and the other end against the lever 87, as shown in Fig. 6. The lever 87 is normally held against rotation by means of the stud 80, as shown in Fig. 3. However, when the stud 80 is rotated far enough to raise the link 81 to cause the arm 75 to be rocked into the path of the shoulder 83, the lever 87 will be free to move, thereby permitting the arm 85 to be rocked to position the half-round stud 84 beneath the arm 73.

After the machine is stopped during the cycle of operation and after the impression has been made on the first card, the operator can adjust the carriage to print upon any desired line of the second card. In order to again release the machine to permit it to complete its cycle of operation it is necessary to provide an auxiliary motor bar, because at this time the main motor bar is ineffective for releasing the machine. This auxiliary bar is shown in Figs. 3 and 7. Fig. 7 shows the auxiliary motor bar 34 in its depressed position, and shows the machine released. Depression of the bar 34 lowers a link 91 upon which the bar 34 is mounted by means of two studs 92. The link 91 is guided by a stud 93 which projects through a slot in the link. The lower end of the link 91 is provided with a stud 94 which projects through a slot in the beforementioned lever 87. Thus, depression of the arm 34 will cause the lever 87 to be rocked counter-clockwise against the tension of the spring 89, thereby moving the link 88 toward the left (Fig. 6) to disengage the half-round stud 84 from the surface 86, thereby permitting the spring 74 to again rock the arm 75 counter-clockwise to release the machine, as shown in Fig. 7. Near the end of the cycle of operation, a stud 100, which is also secured to the gear 44, will raise the link 81 to again stop the machine.

Figure 5:
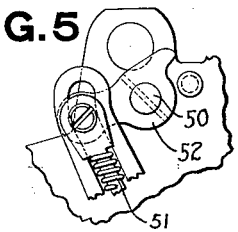
Fig. 5 is a detail view of the spring for causing the key lock line to be rocked when the main motor bar is depressed.

*Total taking operations.*—As is well known in machines of this type, the main cam shaft 46 receives two complete rotations during a total taking operation. However, the printing is performed only during the second rotation of the shaft 46, and for this reason a means is provided for preventing the arm 85 from being rocked to cause the half-round stud 84 to move into the path of the arm 73 during the first cycle of operation. This device consists of a latch 101 (Fig. 8), which is adapted to cooperate with a half-round stud 102 on the beforementioned lever 87. However, the latch is held in a position in which it cannot engage the stud 102 during adding operations, as shown in Fig. 3. The latch is pivoted on a lever 103 pivoted on a stud 104 carried by the side frame of the machine. The lever 103 is provided with a stud 105 which is normally held in engagement with a shoulder 106 of a link 107 (see also Fig. 13). The link 107 is stationary during adding operations, but when the total lever 35 is adjusted for total taking operations, the link 107 is lowered by means of an arm 108 secured to a shaft 109. The shaft 109 is rocked by movement of the total lever by means not herein disclosed. The lower end of the lever 107 is pivoted to a yoke 110 (Fig. 3), for controlling the printer during total taking operations, as is well known in the art. The mechanism for controlling the printer is shown and described in the above mentioned Shipley patent, and is illustrated in Figs. 5 and 6 of said patent. A spring 111, stretched between a stud 112 on the link 107 and a stud 113 on the latch 101, normally holds the latch in engagement with a stud 114 of a rotatable star wheel 117 mounted on the lever 103. The spring 111 will thus hold the stud 105 against the shoulder 106 of the link 107, above mentioned. When the shaft 109 is rocked by movement of the total lever, the link 107 will be lowered and thereby permit the lever 103 to rotate about its pivot 104 until a projection 115 engages a stud on the side frame, as shown in Fig. 8. Rotation of the lever 103 will also permit the latch 101 to be lowered until a notch 116 thereon is moved into the path of the beforementioned stud 102. When the machine is released for operation, and the stud 80 is moved away from the lever 87, the latch 101 will prevent movement of the lever, thereby preventing the arm 85 from rocking. Thus, when the stud 80 raises the link 81 and arm 73 during the first cycle of operation, the half-round stud 86 cannot move beneath the arm 73, and therefore the spring 74 will cause the arm 75 to immediately move out of the path of the shoulder 83, thus permitting the shaft 46 to complete its first cycle of operation. Just before the shaft 46 completes its first cycle of operation, the stud 80 will engage the star wheel 117, thereby causing it to rotate and to disengage the stud 114 from the notch in the latch 101 and cause a second arm of the star wheel 117 to raise the latch 101, as shown in Fig. 10. This movement will cause the shoulder 116 of the latch 101 to be raised out of the path of the half-round stud 102, so that during the second cycle of the total taking operation the lever 87 will be free to rock under the action of the spring 89 just as during adding operations. This movement will cause the half-round stud 86 to move beneath the arm 73, thereby holding the arm 75 in engagement with the shoulder 83, thus stopping the machine.

Near the end of the second cycle of operation, the stud 80 will again rotate the star wheel 117 to a position in which a second stud 114 will be engaged by the latch 101, thus permitting the latch 101 to be lowered to its normal position.

When the total lever is again returned to its normal position, the shaft 109 will be rocked in a clockwise direction, thus raising the lever 103 and latch 101 to their normal positions, shown in Fig. 3.

*Operation.*—This invention is adapted for use on machines in which data are printed on different lines of two separate cards. Both cards are inserted on a carriage which is adjusted before the machine is released, to print upon one of the cards. The machine is released by depressing the main motor bar, and it operates until the first printing operation has been completed. At this time the first card is ejected and the machine is automatically stopped. This will enable the operator to adjust the carriage for printing on the second card, after which an auxiliary motor bar is depressed for releasing the machine, whereupon the machine completes its cycle of operation and the second impression is made. During total taking operations this printing is performed during the second cycle of operation. During this cycle of operation, the machine is controlled just as during adding operations. The machine is stopped and the operator adjusts the carriage for taking an impression on the second card.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of means for normally locking the machine against operation, manipulative means for releasing the machine, means for stopping the machine before it completes a cycle of operation, and another manipulative means for releasing the machine for permitting the machine to complete its cycle of operation.

2. In a machine of the class described, the combination of means for normally locking the machine against operation, a plurality of manipulative devices for releasing the machine for operation, one of said devices being operable only for releasing the machine when the machine is in its normal position, and means for causing the machine to be stopped after it has completed a partial cycle of operation, the other of said devices being operable only for releasing the machine after the machine has been stopped during the cycle of operation.

3. In a machine of the class described, the combination of a locking means for normally locking the machine against operation, a manipulative device adapted to permit said means to operate for releasing the machine, means for operating said locking means to stop the machine before it completes a cycle of operation, a member for holding said locking means in its locking position, and another manipulative device for shifting said member thereby permitting said locking means to operate to permit the machine to complete its cycle of operation.

4. In a machine of the class described, the combination of a locking means for normally locking the machine against operation, a manipulative device adapted to permit said means to operate for releasing the machine, means for operating said locking means to stop the machine before it completes a cycle of operation, a member for holding said locking means in its locking position, resilient means for operating said member, means for holding said member in its ineffective position when the machine is in its normal position, a stop on said locking means for holding said member in its ineffective position after the machine has been released by said manipulative device, means for moving said locking means to stop the machine before it completes its cycle of operation and for disengaging said stop from the said member thereby permitting the resilient means to move the member into position for holding the locking means in effective position, and a manipulative device for moving said member into position for releasing said locking means, thereby permitting the machine to complete its cycle of operation.

5. In a machine of the class described, the combination of locking means for normally locking the machine against operation, manipulative means for releasing the locking means, a driving shaft adapted to make two cycles of operation, stopping means for stopping the machine during the second cycle of operation, and means for preventing said stopping means from becoming effective during the first cycle of operation.

6. In a machine of the class described, the combination of locking means for normally locking the machine against operation, manipulative means for releasing the locking means, a driving shaft adapted to make two cycles of operation, stopping means for stopping the machine during the second cycle of operation, means for preventing said stopping means from becoming effective during the first cycle of operation, and manipulative means for releasing said stopping means after the machine has been stopped.

7. In a machine of the class described, the combination of a driving shaft adapted to make two cycles of operation, stopping means for stopping the shaft during one of said cycles, and manipulative means for releasing said shaft for completing the operation.

8. In a machine of the class described, the combination of a shaft adapted to make a single cycle of operation during adding operations and two cycles of operation during total taking operations, means for stopping said shaft during the adding cycle and during one of the cycles of a total taking operation, and means for preventing the stopping means from becoming effective during the other of the cycles of a total taking operation.

9. In a machine of the class described, the combination of a driving shaft adapted to make two cycles of operation, an arm for stopping the shaft during one cycle of operation, a stud for shifting said arm into position to stop said shaft, a member adapted to be rocked into the path of said arm for holding said arm in locking position, means for preventing said member from rocking into the path of the locking arm during one cycle of operation, and a manipulative device for rocking said member out of the path of said arm thereby permitting said arm to release the shaft to complete the cycle of operation.

10. In a machine of the class described, the combination of a driving shaft adapted to make a single cycle during adding operations and two cycles during total taking operations, a total control lever, means for stopping the machine once during adding operations and once during total taking operations, and means controlled by the total lever for controlling the time said stopping means becomes effective.

11. In a machine of the class described, the combination of a driving shaft adapted to make one cycle of operation during adding operations and two cycles of operation during total taking operations, means for stopping the shaft during adding and total taking operations, a latch for preventing said stopping means from becoming effective for stopping the shaft during one of the cycles of a total taking operation, and a total lever for determining the two cycle operation, said lever being adapted to control said latch.

12. In a machine of the class described, the combination of a shaft adapted to make one cycle of operation during adding operations and two cycles of operation during total taking operations, a pivoted arm adapted to stop said shaft prior to completing its adding cycle of operation, a member for holding said arm in its locked position, a manipulative device for releasing said arm to permit the shaft to complete its cycle of operations, a total lever for controlling the shaft for total taking operations, a latch controlled by said lever adapted to prevent said member from moving into position to hold said arm during the first cycle of a total taking operation, means operated by the shaft for releasing said latch for permitting said member to be moved into position to hold said arm in its locking position during the second cycle of a total taking operation thereby stopping the shaft before it completes its second cycle of operation, and a manipulative device for releasing said arm for permitting the shaft to complete its operation.

In testimony whereof I affix my signature.

LEO G. A. KÖMMLING.